US005381822A

United States Patent [19]

Christensen

[11] Patent Number: 5,381,822

[45] Date of Patent: Jan. 17, 1995

[54] RELIEF VALVE WITH HYDRAULIC FUSE

[75] Inventor: Norman B. Christensen, Sarasota, Fla.

[73] Assignee: Dana Corporation, Toledo, Ohio

[21] Appl. No.: 157,550

[22] Filed: Nov. 26, 1993

[51] Int. Cl.[6] .......... F16K 17/30

[52] U.S. Cl. .......... 137/460; 137/508; 91/420; 92/77

[58] Field of Search .......... 137/460, 508; 91/420; 92/77

[56] References Cited

U.S. PATENT DOCUMENTS

| | | | |
|---|---|---|---|
| 2,411,392 | 11/1946 | Saville | 137/152 |
| 2,645,242 | 7/1953 | Monnich | 137/508 X |
| 2,821,209 | 1/1958 | Waterman | 137/498 |
| 3,131,715 | 5/1964 | Sanders | 137/508 X |
| 3,792,715 | 2/1974 | Parrett et al. | 137/493 |
| 3,844,378 | 10/1974 | Balogh | 91/420 X |
| 3,910,306 | 10/1975 | Ohrn | 137/498 |
| 3,972,557 | 8/1976 | Hudston et al. | 91/420 X |
| 4,373,548 | 2/1983 | Chou | 137/460 |
| 4,555,976 | 12/1985 | Wolfges | 91/420 |
| 4,629,156 | 12/1986 | Anderson et al. | 251/60 |
| 4,976,281 | 12/1990 | Berglund | 137/460 |
| 5,107,679 | 4/1992 | Bartlett | 60/481 |

*Primary Examiner*—Stephen M. Hepperle
*Attorney, Agent, or Firm*—Millen, White, Zelano, & Branigan

[57] ABSTRACT

A relief valve for the hydraulic fuse minimizes the chance of a device such as a hydraulically powered lift device from collapsing upon a break in a hydraulic input line to a cylinder powering the lift. The relief valve comprises a valve seat biased in a first direction by a relatively heavy spring and a hydraulic fuse biased away from the valve seat by a relatively light, second spring. Upon a break occurring in the hydraulic input line, back pressure urges the fuse to seat against the valve seat, thus closing the valve. Upon applying additional hydraulic pressure in the direction of the fuse, the valve seat disengages from the fuse, allowing hydraulic fluid to flow through the relief valve and thus allowing a piston in the hydraulic cylinder to retract so as to permit lowering of the lift device.

13 Claims, 2 Drawing Sheets

RELIEF VALVE WITH HYDRAULIC FUSE

FIELD OF THE INVENTION

The invention relates to a relief valve with a hydraulic fuse, and, more particularly, the invention relates to a relief valve with a hydraulic fuse, wherein the fuse blocks retraction of a piston rod into a hydraulic cylinder upon a sudden drop in hydraulic pressure within the cylinder due to, for example, a hydraulic input line bursting.

BACKGROUND ART

On occasion, hydraulic hoses connected to hydraulic cylinders in a device such as a scissors lifts fail. Failure of a hydraulic input hose results in a sudden pressure loss wherein hydraulic fluid can rapidly flow from the hydraulic cylinder allowing the scissors lift collapse. This can, of course, result in injury to personnel and in equipment damage.

In order to minimize the chance of a hydraulically powered, lift device collapsing, hydraulic fuses are utilized which prevent back flow through hydraulic lines upon a loss of pressure. In the case of a lift, such as a scissors lift, the hydraulic fuse is moved to a blocking position by the weight of the raised lift which pushes the piston in the hydraulic cylinder used to accomplish the lift back into the cylinder. This ejects fluid from the cylinder moving the fuse to block flow of hydraulic fluid out of the cylinder.

Once the hydraulic system is blocked, the hydraulic lift cannot collapse. This leaves the operator suspended above the ground. In order to lower the operator, the system is pumped. This requires that a separate valve be connected to the hydraulic line.

SUMMARY OF THE INVENTION

It is a feature of the present invention to provide, in hydraulic systems, a relief valve which incorporates a hydraulic fuse in combination with the relief valve.

In view of this feature and other features, the present invention contemplates a relief valve, useful in hydraulic systems, wherein the relief valve comprises a valve seat and a first spring having a first spring force for urging the valve seat in a first direction. Upon the application of a first fluid pressure having a force greater than the first spring force, the valve seat is moved in a direction opposite the first direction. A second spring is provided having a second spring force less than the first spring force to bias a fuse away from the valve. The fuse is urged toward the valve seat upon application of a second fluid pressure having a force greater than the second spring force. This closes the valve. Upon application of a fluid pressure greater than the first fluid pressure, the valve seat and fuse disengage to allow passage of hydraulic fluid through the valve, thus relieving the system.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
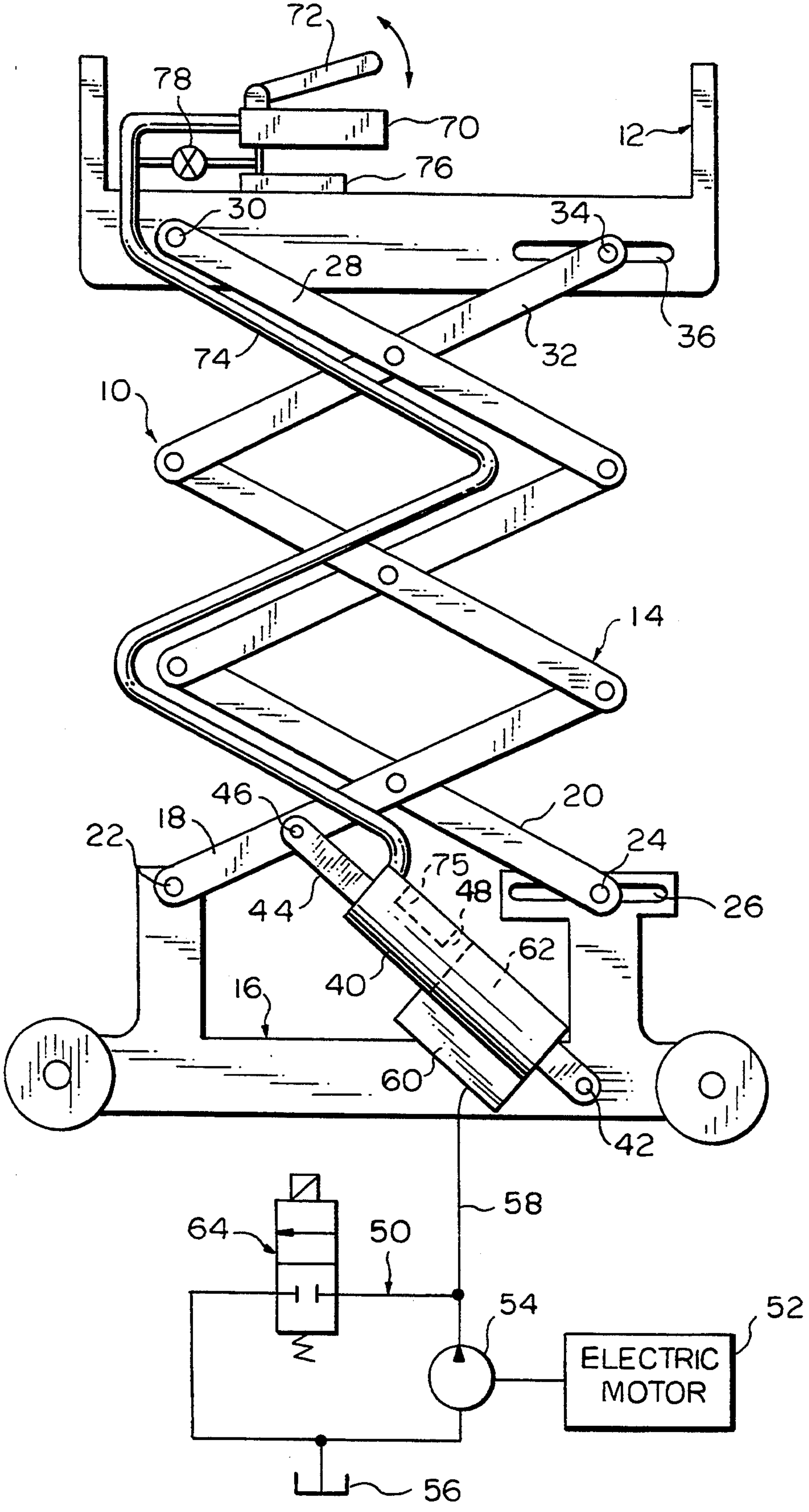
FIG. 1 is a side view showing a scissors lift powered by a hydraulic cylinder which has associated therewith a relief valve configured in accordance with the present invention and incorporating a hydraulic fuse therein.

FIG. 1—The System in General

Referring now to FIG. 1, there is shown a scissors lift 10 comprising a bucket 12 which is lifted by a scissors linkage 14 mounted on a wheeled, portable base 16. The scissors linkage 14 has first and second bottom links 18 and 20 wherein the bottom link 18 is pivoted by a pivot pin 22 to the base 16, while the link 20 has a bottom pivot pin 24 which is received in a slot 26 in the base 16. The bucket 12 is attached to the scissors linkage 14 by a top link 28 pivoted by a pin 30 thereto and a top link 32 which has a pin 34 received in a slot 36 in the bucket. As the scissors linkage 14 is squeezed, the bucket 12 is raised with respect to the base 16.

Squeezing of the scissors linkage 14 is accomplished by a hydraulic cylinder 40 which has one end pivoted to the base 16 by a pin 42 and a piston rod 44 which is pivoted by a pin 46 to the bottom link 18 of the scissors linkage. The piston rod 44 is driven by a piston 48 upon pressurizing the cylinder 40 with hydraulic fluid.

The hydraulic cylinder 40 is pressurized by a hydraulic circuit 50 in which an electric motor 52 drives a hydraulic pump 54 to withdraw hydraulic fluid from a sump 56 and conveys the hydraulic fluid over a line 58 to a relief valve 60, configured in accordance with the principles of the instant invention. The hydraulic fluid then flows into chamber 62 of the hydraulic cylinder 40 behind the piston 48. In order to lower the bucket 12, a control valve 64 is shifted from the position shown in FIG. 1 to a position opening the valve so that oil drains through the open valve portion 66 of the control valve back to the sump 56, thus emptying the chamber 62 under pressures applied on the piston 48 due to the weight of the bucket 12 and the scissors linkage 14.

If the line 58 breaks or if any of the components such as the pump 54, electric motor 52 or valve 64 malfunction or break, releasing pressure on the line 58, the hydraulic fluid in chamber 62 will tend to flow out through the relief valve 60 either on to the ground or into the sump 56. This can occur very quickly, resulting in a rapid collapse of the scissors link 14 and rapid decent of the bucket 12.

In accordance with the arrangement of the present invention, the bucket 12 includes a hand pump 70 operated by a handle 72 which pumps hydraulic fluid through an exhaust line 74 of the hydraulic cylinder 40 so as to pressurize the chamber 75 on the other side of the piston 48. Normally, hydraulic fluid in line 74 flows to a sump 76 as the piston 48 advances out of the hydraulic cylinder 40. This is because a normally open valve 78 connects the exhaust line 74 directly to the sump 76. Upon closing the valve 78, the pump 70 is able to return fluid from the sump 76 directly to the line 74 and thus to the chamber 75 of the hydraulic cylinder. As will be described hereinafter, the relief valve 60 has a hydraulic fuse therein which stops flow back through the line 58 upon pressure in the line 58 dropping below a predetermined pressure. This can occur upon a rupture of the line 58 or perhaps a malfunction of the pump 54, valve 64 or any other component in the hydraulic power system 50.

Figure 2:
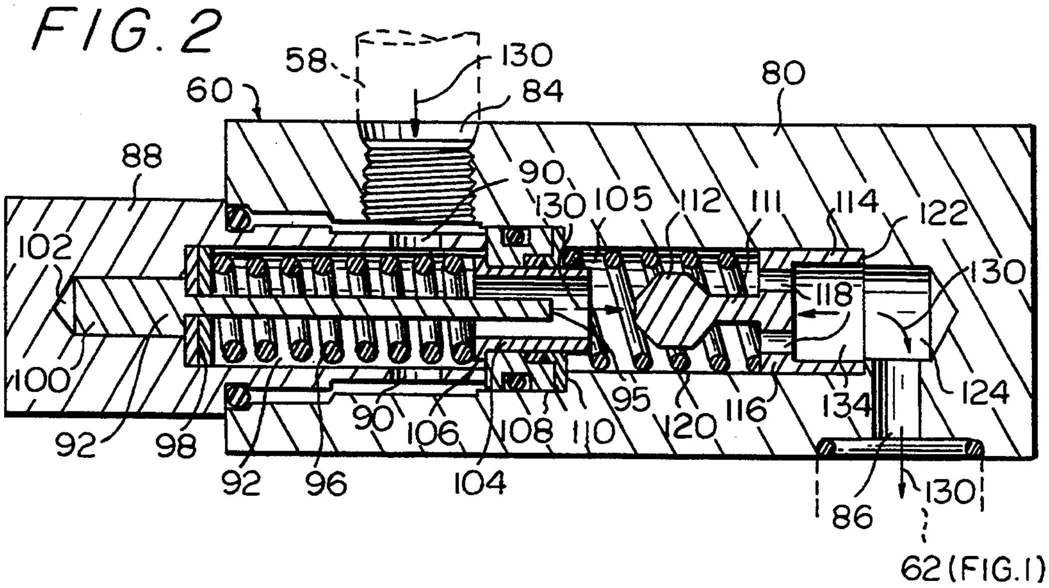
FIG. 2 is a side elevation of the relief valve of FIG. 1 show how the relief valve functions during normal operation.

FIG. 2—Normal Operation of the Relief Valve

Referring now mainly to FIG. 2, FIG. 2 shows the relief valve 60 configured in accordance with the principles of the instant invention in its mode of normal operation. The relief valve 60 has a housing 80 with a bore 82 therein connecting a first port 84 of the housing to a second port 86 of the housing. The first port 84 is connected to the hydraulic inlet line 58 (see FIG. 1) while the second port 86 is connected directly to the chamber 62 of the hydraulic cylinder 40 (see FIG. 1) with the components of the relief valve disposed in the bore 82 between the first and second ports 84 and 86 in order to control the flow of hydraulic fluid through the relief valve.

The relief valve 60 comprises a first plug portion 88 which has a plurality of ports 90 therein through which hydraulic fluid flows from the hydraulic inlet 58 into a bore 92 in the plug 88. The bore 92 has a stop pin 94 with a stop surface 95 projecting therethrough around which is positioned a first, relatively heavy, coil spring 96. The coil spring 96 bears against washers 98 proximate the bottom end of the bore 92 to hold the end 100 of the stop pin 94 seated in a counter bore 102 at the blind end of the plug 88. The opposite end of the spring bears against the bottom end of a bushing 104 having an annular valve seat 105 at the opposite end thereof to urge the annular valve seat to the right. The bushing 104 with the valve seat 104 has an annular bottom flange 106 which is engaged by the first heavy coil spring 96 and bears against a composite stop 108, which is held in place by the end 109 of the plug 88 against a shoulder 110 in the bore 92 of the housing 80.

Disposed in the bore 82, opposite the valve seat 104, is a hydraulic fuse 111. The hydraulic fuse 111 has a head portion 112 and a collar portion 114 connected to the head portion by a circular flange 116 which has a plurality of openings 118 therein. A second coil spring 120, which is relatively light compared to the first coil spring 96 and exerts a second spring force against the fuse 112, is disposed between the end of the composite piston 108 and the flange 116 of the fuse 111. The second coil spring 120 urges the collar 114 to bottom against a seat 122 in the bore 82 of the housing 80. Just behind the seat 122 is a space 124 which communicates with the port 86 connecting the housing 80 of the relief valve to the chamber 62 of the hydraulic cylinder 40 (see FIG. 1).

During normal operation, the hydraulic fluid flows in the direction of arrows 130 so that it enters the port 84, flows into the inlets 90 and the plug 88 and thus into the bore 92. From the bore 92, the hydraulic fluid flows through the bushing 104, past the head 112 of the fuse 111 and bleeds through the openings 118 in the flange 116 of the fuse. The hydraulic fluid then passes into the space 124 and out of the port 86. As is evident in FIG. 1, the hydraulic fluid enters the chamber 62 of the hydraulic cylinder 40 and pushes the piston 48 and piston rod 44 to the left expanding the scissors linkage 14 and raising the bucket 12.

When it is desired to lower the bucket 12, the valve 64 (see FIG. 1) is opened, allowing hydraulic fluid to flow from the chamber 62 through the relief valve 60 and back to the sump 56 (see FIG. 1). In the relief valve 60, the hydraulic fluid follows the dotted line arrows 134, passing through the openings 118 in the flange 116 of the fuse 110. The second spring 120 is set so that the fuse 111 does not, under normal circumstances, allow the scissors linkage 14 to collapse, lowering the bucket 12. This is because the pressure differential between the pressure of the input line 58 and the pressure at the port 86 does not exceed the predetermined level necessary to collapse the second coil spring 120.

Figure 3:
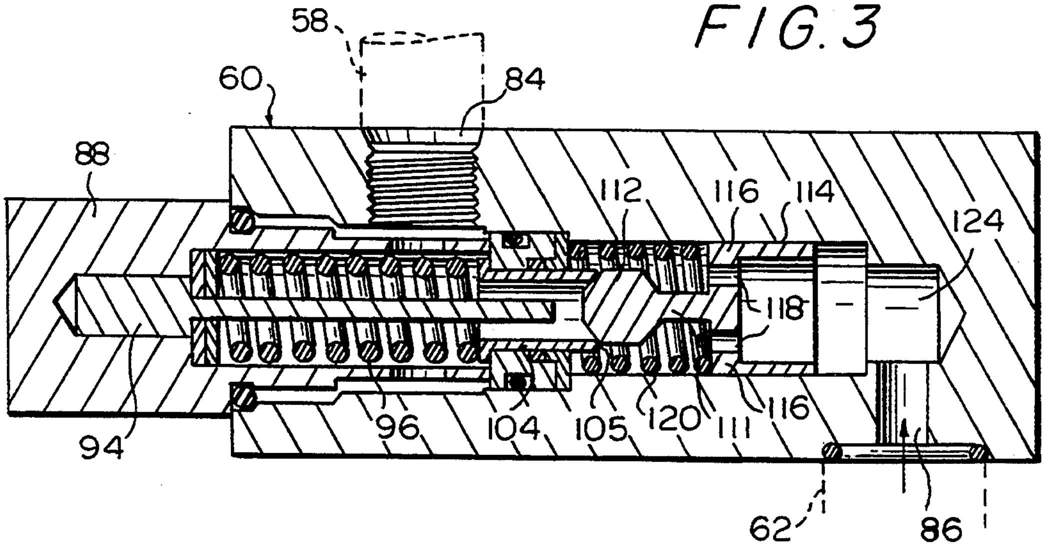
FIG. 3 is a view similar to FIG. 2, but showing the hydraulic fuse actuated to close a hydraulic input line upon a break in the hydraulic input line or upon malfunction of a component associated therewith.

Break in the Line 58—FIG. 3

Referring now to FIG. 3, if there is a break in the line 58, or a malfunction in the components of the hydraulic power circuit 50, then the pressure of the hydraulic fluid applied to the first port 84 of the relief valve 60 can drop drastically. This drastic drop in pressure causes a pressure differential greater than that which can be overcome by the bias of the second, relatively light coil spring 120 due to high pressure at the port 86. This causes the fuse 111 to move to the left and to seat against the annular valve seat 105 on the bushing 104. When the head 112 of the fuse 111 is seated against the annular valve seat 105, hydraulic fluid can no longer flow past the fuse 111 and is thus retained in chamber 62 of the hydraulic cylinder 40 (see FIG. 1). Since the hydraulic fluid cannot flow out of the chamber 62, the scissors linkage 14 cannot collapse (see FIG. 1). This keeps the bucket 12 raised (see FIG. 1). The first spring 96, which is heavier than the second spring 120, urges the valve seat 105 to the right and, thus urges the composite piston 108 to the right against the shoulder 110. This effectively closes the relief valve 60.

Figure 4:
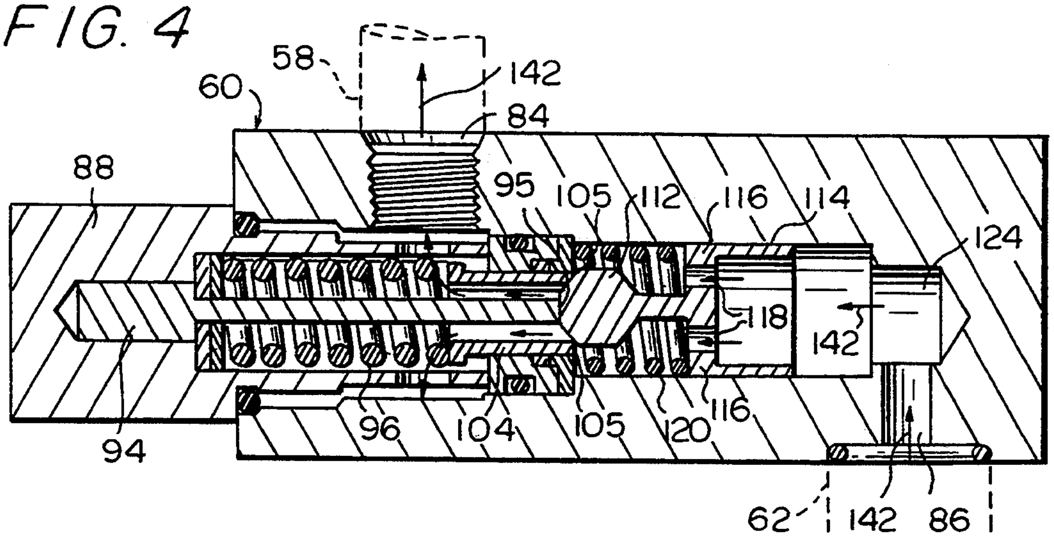
FIG. 4 is a view similar to FIGS. 2 and 3 showing the relief valve reacting to hand pump operation in order to lower the scissors lift.

Lowering the Bucket 12 by Operation of the Hand Pump 70—FIG. 4

Referring now to FIG. 4, operation of the hand pump 70 (FIG. 1) applies hydraulic fluid to the second port 86 at an overpressure higher than the pressure generated due to the weight of the scissors linkage 114 and bucket 12. This occurs because the chamber 75 in hydraulic cylinder 40 is pressurized (see FIG. 1), tending to push the piston 48 into the chamber 62 and thus tending to expel hydraulic fluid from the chamber 62 out through the second port 86.

The overpressure is also applied against the circular flange 116 on the fuse 111, forcing the head 112 of the fuse to push against the seat 105 of the bushing 104. This causes the bushing 104 to move against the bias of spring 96 from the FIG. 3 to the FIG. 4 position, where the head 112 of the fuse 111 bottoms against the free end 95 of the stop 94. The overpressure then works against the valve seat 105 to further move the bushing against the bias of the spring 75, opening a gap 140 between the head 112 and the valve seat. Hydraulic oil then follows the path of arrows 142 through the holes 118 in the flange 116 of the fuse 110, through the gap 140, into the bore 92 of the plug 88, and then flows out of the openings 90 and through the second port 84. After leaving the second port, the hydraulic oil flows out through the break in line 58 or back through the hydraulic circuit 50 into the sump 56. A container of some sort should be placed proximate the break in the line 58 to catch the returning hydraulic fluid which leaks out of the line 58.

As the handle 72 is continually pumped, the scissors linkage 14 collapses, lowering the bucket 12.

With the arrangement of the relief valve 60, the hydraulic fuse 111 is incorporated within the relief valve 60 and cooperates with the relief valve structure to provide both a device for preventing rapid decent of the bucket 12 and a device for allowing the bucket to be slowly lowered by being pumped down with the hand pump 70.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A relief valve useful in a hydraulic system, the relief valve comprising:

a valve seat having a:

a first spring having a first spring force for urging the valve seat in a first direction;

means for urging the valve seat in a second direction opposite the first direction upon the application of a first fluid pressure having a force greater than the first spring force;

a second spring having a second spring force less than the first spring force;

a fuse engaged by the second spring and being urged by the second spring force away from the valve seat;

means associated with the fuse for urging the fuse toward the valve seat upon application of a second fluid pressure having a force greater than the second spring force; and means for disengaging the valve seat and fuse to allow passage of hydraulic fluid through the valve upon application of fluid pressure greater than the first pressure to the valve seat.

2. The relief valve of claim 1, wherein the valve seat is on an end of a bushing slidingly received in the relief valve.

3. The relief valve of claim 2, wherein the second spring is disposed a stop slidably supporting between the bushing and the fuse.

4. The relief valve of claim 3, wherein the fuse includes means for allowing fluid at a pressure less than the second selected pressure to bypass the fuse.

5. The relief valve of claim 4, wherein the fuse is disposed in a bore of a housing for reciprocation in the bore and wherein the means for allowing fluid to bypass the fuse are openings through the fuse, the openings bleeding fluid therethrough until the force of the fluid pressure exceeds the second spring force.

6. The relief valve of claim 5, wherein the housing includes a first bore for fluid passage proximate the bushing and a second bore for fluid passage proximate the fuse.

7. The relief valve of claim 1, wherein the fuse includes means for allowing fluid at a pressure less than the second selected pressure to bypass the fuse.

8. The relief valve of claim 7, wherein the fuse is disposed in a bore of a housing for reciprocation in the bore and wherein the means for allowing fluid to bypass the fuse are openings through the fuse, the openings bleeding fluid therethrough until the force of the fluid pressure exceeds the second spring force.

9. A relief valve useful in a hydraulic lift system for preventing collapse of a hydraulic lift, wherein the system includes a hydraulic cylinder with a piston therein, the hydraulic cylinder being connected to a first line for pressurizing the cylinder and a second line for exhausting the cylinder, wherein the relief valve is connected between the second line and the hydraulic cylinder, the improvement comprising:

a valve seat biased in a first direction by a first spring having a first spring force applied in a first direction;

a fuse aligned with the valve seat and being biased away from the valve seat by a second spring having a spring force less than the first spring force;

means for allowing a fluid pressure having a force less than the second spring force to bypass the fuse;

means for seating the fuse with the valve seat when the fluid pressure exceeds the force of the second spring means; and means for disengaging the fuse and valve seat from one another upon a pressure having a force greater than the first spring force being applied in a second direction opposite the direction of the first spring force.

10. The improvement of claim 9, wherein the means for allowing fluid pressure to bypass the fuse comprise openings through the fuse.

11. The improvement of claim 10, wherein the means for seating the fuse is a pressure force on the fuse.

12. The improvement of claim 11, wherein a housing is provided for containing the valve seat and fuse, the housing having a first port proximate the valve seat and a second port proximate the fuse.

13. The improvement of claim 12, wherein the valve seat is configured as a bushing concentric with a stop and having a flange thereon for engaging the stop, wherein the first spring engages the flange and wherein the means for disengaging the fuse from the valve seat comprises a stop pin extending through the bushing for engaging the fuse upon application of the pressure having a force greater than the first spring force to create a gap between the fuse and bushing through which gap the hydraulic fluid passes.

* * * * *